United States Patent [19]

Jackson, Jr.

[11] 3,784,264

[45] Jan. 8, 1974

[54] EARTH BORING BIT BEARING SYSTEM HAVING A PITTED BEARING SURFACE

[75] Inventor: G. C. Jackson, Jr., Dallas, Tex.

[73] Assignee: Dresser Industries, Inc., Dallas, Tex.

[22] Filed: Mar. 2, 1971

[21] Appl. No.: 120,142

[52] U.S. Cl. .................. 308/8.2, 175/227, 308/241
[51] Int. Cl. ............................................ F16c 33/12
[58] Field of Search .......................... 308/239, 241; 184/1 E; 29/106; 252/26; 175/227, 229

[56] References Cited
UNITED STATES PATENTS

| | | | |
|---|---|---|---|
| 3,199,878 | 8/1965 | Cunningham et al. | 308/8.2 |
| 2,321,203 | 6/1943 | Henry | 252/26 |
| 1,913,953 | 6/1933 | Prendergrast | 252/26 |
| 2,543,741 | 2/1951 | Zweifel | 252/26 |
| 2,839,159 | 6/1958 | Peters | 252/26 |
| 3,360,312 | 12/1967 | DeWit et al. | 308/241 |
| 3,235,316 | 2/1966 | Whanger | 308/239 |
| 1,598,321 | 8/1926 | Sherwood | 308/241 |
| 2,354,218 | 7/1944 | Murray | 184/1 E |
| 2,697,645 | 12/1954 | Mitchell | 308/241 |

FOREIGN PATENTS OR APPLICATIONS 874,264  8/1961  Great Britain ....................... 252/26

Primary Examiner—Charles J. Myhre
Assistant Examiner—Barry Grossman
Attorney—Robert W. Mayer, Thomas P. Hubbard, Daniel Rubin, Raymond T. Majesko, William E. Johnson, Jr. and Eddie E. Scott

[57] ABSTRACT

The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

24 Claims, 5 Drawing Figures

3,784,264

INVENTOR:
G. C. JACKSON, JR.

Eddie E. Scott

ATTORNEY

INVENTOR
G. C. JACKSON, JR.

Eddie E. Scott

ATTORNEY

3,784,264

EARTH BORING BIT BEARING SYSTEM HAVING A PITTED BEARING SURFACE

BACKGROUND OF THE INVENTION

The present invention relates to a bearing system for an earth boring bit and more particularly to a friction bearing with improved performance and longer lifetime characteristics. The present invention is especially adapted for use on that type of rock bit popularly known as a three cone bit; however, its use is not restricted thereto and the bearing system of the present invention can be used in other equipment wherein an improved bearing system is required.

A three cone rotary rock bit is adapted to be connected as the lower member of a rotary drill string. As the drill string is rotated the bit disintegrates the formations to form an earth borehole. The three cone rotary rock bit includes three individual arms that extend angularly downward from the main body of the bit. The lower end of each arm is shaped to form a bearing pin or journal. A cone is mounted upon each bearing pin (or journal) and adapted to rotate thereon. The cones include cutting structure on their outer surface that serves to disintegrate the formations as the bit is rotated.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones thereby providing a longer useful lifetime for the cones. This has resulted in the bearing system being the first to fail during the drilling operation. Consequently, a need exists for an improved bearing system to extend the useful lifetime of the bit.

Friction and anti-friction bearings, as well as a combination of friction and anti-friction bearings, have been used in rotary rock bits. The anti-friction bearings employed have been typically a set of rollers and a set of balls positioned in mating raceways in the cone and bearing pin. Certain disadvantages are associated with anti-friction bearings in that space is required to accommodate the rollers and balls and this space is obtained only by sacrificing bearing pin metal, cone shell thickness, or a combination of both. Friction bearings have encountered problems when used in rotary rock bits and have failed to provide the desired performance. It is generally necessary to have a friction bearing length to diameter ratio of greater than two and one-half when operating under severe conditions. The size limitations of a rotary rock bit make it impossible to provide this desired ratio and prior art friction bearings used in rock bits have suffered early failure under the severe operating conditions.

In order to obtain high penetration rates with a rotary rock bit in some formations, it is necessary to apply heavy loads on the bit and to operate the bit at a moderate speed. With other formations, only moderate loads are required but the bit must be operated at relatively high speeds. In addition, the rock bit operates under a highly corrosive environment and is adjusted to temperature extremes. The drilling operation may be conducted thousands of feet underground wherein elevated temperatures are encountered. The bit is continually flushed by a circulating drilling fluid to cool the bit and carry away the drill cuttings. This fluid is generally water with chemical additives to control water loss or to control viscosity and/or ph. Some of these chemicals may result in a corrosive drilling fluid. The drill cuttings, the materials encountered in the earth formations, barites added for fluid weight control, and the chemical composition of the drilling fluid combine to create a corrosive and abrasive drilling environment. The bearing systems of the prior art have also experienced problems when air or other gases are used as the cooling and flushing fluid. This may be the result of increased operating temperatures or other damaging environmental conditions. The bit is subjected to a wide range of fluid pressures during the drilling operation. When the bit is at the surface, it is of course only subjected to atmospheric pressure; however, when lowered into the well bore, it will be exposed to very high fluid pressure because of the head of fluid in the well bore. In addition, as drilling fluid is circulated through the drill string, additional pressures are introduced.

In view of the circumstances explained above, it can be appreciated that a bearing system for a rotary rock bit must include exceptional performance characteristics in a limited geometrical configuration. Since the entire drill string must be withdrawn to replace the bit when it fails, it is highly desirable to have the bearing system operate for an extended period of time.

DESCRIPTION OF THE PRIOR ART

In U. S. Pat. No. 3,595,903 to K. H. Swart, patented May 6, 1952, a three cone rock bit is shown. The bit includes three shanks which are assembled together to form the bit. The lower end of each shank is formed into a journal and a generally conical tooth cutter is receivable over the journal. The bearing system includes friction-type bearings and antifriction bearings. This patent sets out some of the problems encountered with rotary rock bits.

In U. S. Pat. No. 3,370,895 to G. A. Cason, Jr., patented Feb. 27, 1968, another of the prior art rotary rock bits is shown. This rock bit includes a bearing system with a lubricant reservoir containing lubricant in communication with the bearing.

In U. S. Pat. No. 3,235,316 to J. R. Whanger, patented February 15, 1966, a journal bearing for a rock bit is shown with alternating surface areas of wear-resistant and antigalling materials. The bearing system disclosed in this patent includes grooves in one of the rotatable members and a soft metal having anti-galling characteristics positioned in the grooves.

Friction bearings of the prior art have consistently included smooth bearing surfaces on both relatively rotatable members. Individuals skilled in the art have been concerned with providing smooth bearing surfaces and the general advancement in the art has been the development and combination of improved bearing materials. When anti-galling materials have been provided, they have been limited to the amount of anti-galling material being present in the actual bearing structure itself and an additional source of anti-galling material has not been included.

SUMMARY OF THE INVENTION

The present invention provides a bearing system having a long lifetime, that will support heavy loading, that can withstand high rotational speeds, that is compatible with temperature extremes, that may be operated under highly corrosive and abrasive conditions, and that will withstand pressure variations. This bearing system includes a friction-type or journal bearing with a film of anti-galling material that keeps the rotating parts separated and promotes rotation. The thin film of antigalling material is maintained by the provision of a source of anti-galling material for replacing any portion of the film that is displaced.

In one embodiment of the present invention a three cone rotary rock bit is disclosed that will operate for an extended period of time under severe operating conditions. One of the bearing surfaces is roughened to produce small pits or reservoirs of a size sufficient to entrap and retain a significant amount of anti-galling material. The bearing system includes a lubricant reservoir filled with a lubricant containing entrained particles of anti-galling material. The lubricant and the particles of anti-galling material enter the space between the bearing elements and a film of anti-galling material is established that insures free rotation.

It is therefore an object of the present invention to provide an improved bearing system with a long lifetime.

It is a further object of the present invention to provide a bearing system that will operate under heavy loading and high rotational speed conditions.

It is a still further object of the present invention to provide a bearing system that will operate under temperature extremes.

It is a still further object of the present invention to provide a bearing system for an earth boring bit that will operate under highly corrosive and abrasive drilling conditions.

It is a still further object of the present invention to provide a bearing system for an earth boring bit that will withstand pressure variations.

It is a still further object of the present invention to provide a bearing system for an earth boring bit that includes a reservoir containing anti-galling materials.

It is a still further object of the present invention to provide a bearing system for an earth boring bit including a pitted bearing surface.

It is a still further object of the present invention to provide a method of constructing an improved bearing system for a rotary rock bit.

The above and other objects and advantages of the present invention will become apparent from a consideration of the following detailed description of the invention when taken in conjunction with the drawings.

DETAILED DESCRIPTION OF THE INVENTION

Figure 1:
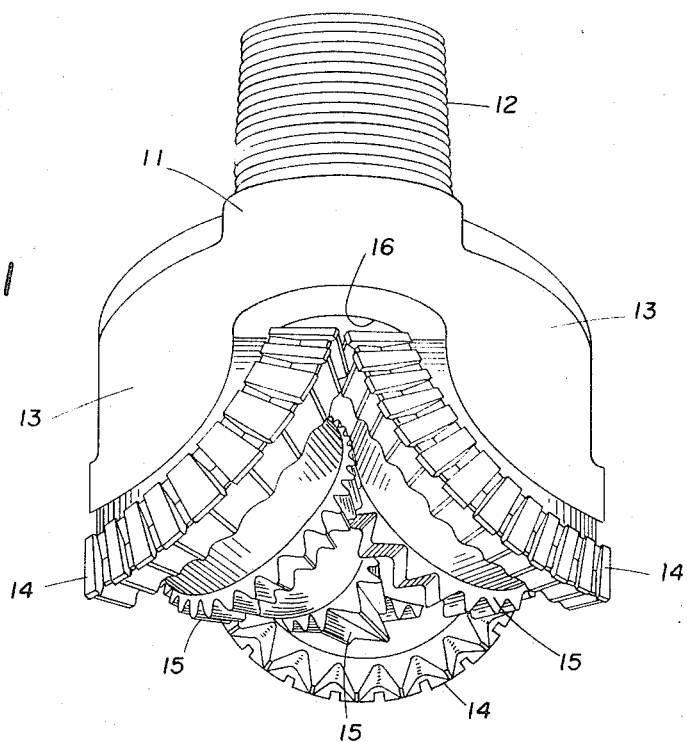
FIG. 1 shows a three cone rotary rock bit.

Referring now to the drawing and to FIG. 1 in particular, shown therein and generally designated by the reference character 10 is a three cone rotary rock bit. As illustrated, the bit 10 includes a bit body 11 including an upper threaded portion 12. The threaded portion 12 allows the bit 10 to be connected to the lower end of a rotary drill string (not shown). Depending from the bit body 11 are three substantially identical arms 13. The lower end of each of the arms 13 is provided with an extended journal portion and the details of this journal portion will be discussed subsequently. Three rotary cone cutters 14 are rotatably positioned upon the three journals extending from the arms 13. Each of the cones 14 includes cutting structure 15 on its outer surface adapted to disintegrate the formations as the bit is rotated and moved downward. The cutting structure 15 is shown in the form of steel teeth; however, it is to be understood that other cutting structure such as tungsten carbide inserts may be used as the cutting structure 15 on the cones.

The bit 10 includes a central passageway 16 extending along the central axis of body 11 to allow drilling fluid to enter from the section of the drill string immediately above and pass downward onto the cutting structure 15 of the cones 14 and the bottom of the hole being bored. In use, the drill bit 10 is connected as a lower member of a rotary drill string and lowered into a well bore until the rotatable cones 14 engage the bottom of the well bore. Upon engagement with the bottom of the well bore, the drill string is rotated, rotating bit 10 therewith. Drilling fluid is forced downward through the interior passage of the rotary drill string and continues through the central passageway 16 of bit 10 passing onto the cutting structure 15 of cones 14 to the bottom of the well bore, thence upward in the annulus between the rotary drill string and the wall of the well bore, carrying with it the cuttings and debris from the drilling operation.

As previously stated, the bearing system must insure free rotation of cones 14 under the severe drilling environmental conditions. The improved bearing system of the present invention provides an earth boring bit with a long lifetime and that will withstand the conditions encountered in drilling a deep well.

Figure 2:
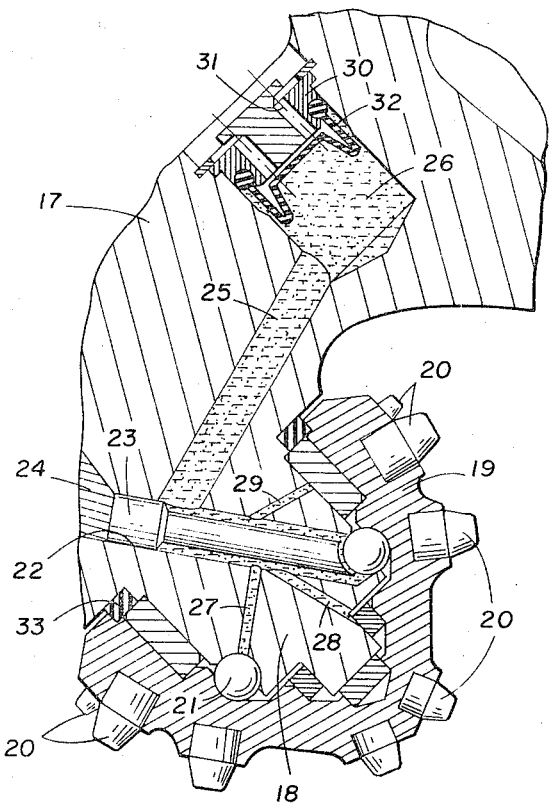
FIG. 2 illustrates in vertical section one-third of a three cone rotary rock bit incorporating a bearing system of the present invention.

A cut-away view of one of the arms 17 of a bit incorporating the bearing system of the present invention is shown in FIG. 2. The bit is adapted to be connected to a rotary drill string and operates in the manner previously described. The elongated lower portion of arm 17 forms a journal 18 and a rotatable cutter 19 is mounted upon journal 18. Positioned on the exterior surface of rotatable cutter 19 is the cutting structure. This includes a series of tungsten carbide inserts 20. As the bit is rotated, the inserts 20 contact and disintegrate the formations to form the earth borehole.

The bearing system of the present invention insures free rotation of rotatable cutter 19 under the severe drilling conditions. A series of ball bearings 21 insure that rotatable cutter 19 is rotatably locked on journal 18 and provides a portion of the bearing support. The rotatable cutter 19 is positioned upon journal 18 and the series of ball bearings 21 inserted through a bore 22 extending into arm 17. After the ball bearings 21 are in place, plug 23 is inserted in bore 22 and welded therein by weld 24.

Journal 18 and arm 17 are also provided with a passage 25 to channel lubricant from a lubricant reservoir 26 to the areas between the various bearing surfaces. Passage 25 intersects bore 22 and plug 23 is of reduced diameter in this area to allow the lubricant to be channeled to the bearings. Additional passages 27, 28 and 29 allow the lubricant to be channeled from bore 22 to the bearings. Lubricant reservoir 26 is filled with a lubricant containing entrained particles of anti-galling material and a cap 30 locked in place on arm 17 to retain the lubricant in reservoir 26. Cap 30 is constructed so that a passage 31 communicates the interior of reservoir 26 with the outside of the bit. This allows pressure equalization and prevents pressure differentials from damaging the bearing system. A flexible diaphragm 32 serves to hold the lubricant in position and at the same time provide compensation for pressure changes.

The lubricant containing entrained particles of antigalling material fills reservoir 26, passage 25, bore 22, additional passages 27, 28 and 29, and the spaces between the rotatable cone cutter 19 and journal 18. A flexible seal 33 is connected to cone cutter 19 and forms a seal between cutter 19 and journal 18 to prevent loss of lubricant or contamination of the lubricant from materials in the well bore. As explained above, pressure on the lubricant is equalized by cap 30 and the lubricant is not lost or contaminated during the drilling operation. As the bit is lowered into the well bore, it will be subjected to increasing fluid pressure the deeper it goes. If means had not been provided for equalizing the pressure on the lubricant, the pressure differential across seal 33 would be sufficient to rupture it.

Figure 3:
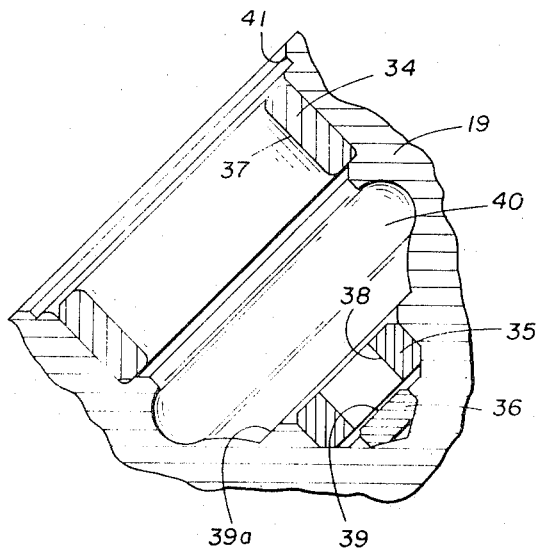
FIG. 3 shows a rock bit cone with an outer bushing, pilot bushing and thrust button in place.

Referring now to FIG. 3 a cut-away view of rotatable cone cutter 19 is shown. Positioned in the inner surface of the shell of cone cutter 19 is an outer bushing 34, a pilot bushing 35, and a thrust button 36. Bushings 34 and 35 and button 36 are locked in cone cutter 19 by force fitting. The inner surfaces 37, 38 and 39 of the outer bushing 34, pilot bushing 35 and thrust button 34 respectively have been roughened and therefore include a quantity of indentations. Specifically, the bearing surfaces 37, 38 and 39 have approximately a 125 R.M.S. roughness. In addition, a thrust surface 39A on the cone 19 has been roughened to include a quantity of indentations giving it a roughness of approximately 125 R.M.S. The thrust surfaces 39 and 39A support the thrust loads and an increase in their useful lifetime is important in extending the lifetime of the bit. The bearing surfaces of journal 18 upon which cone cutter 19 rotates are relatively smooth with an R.M.S. of less than 15 and the area between the bearing surfaces contains the lubricant having entrained particles of anti-galling material. The entrained particles of anti-galling material are picked up by the roughened surfaces 37, 38, 39 and 39A and a thin film of anti-galling material established. This film keeps the bearing surfaces separated and promotes free rotation of cutter 19. Should any of the film of anti-galling material be lost, it will be replaced by additional particles of anti-galling material from the lubricant. The lubricant reservoir 26 serves as a source of anti-galling material to support free rotation of cutter 19.

The structure of one embodiment of a bearing system of the present invention having been disclosed, a method of constructing a bearing system will now be considered with further reference to FIGS. 2 and 3. The outer bushing 34, pilot bushing 35, and thrust button 36 are constructed of a material having the hardness and wear resistant characteristics of carburized and hardened steel of at least 50 rockwell C. The bushings 34 and 35 and thrust button 36 are pressed in place in the shell of cone cutter 19 and the cutter finish ground to the desired size. The ball race 40 and the seal surface 41 are then masked. The interior of cutter 19 is grit blasted to give the bearing surfaces 37, 38, 39 and 39A a roughened surface in the range of 50 to 200 R.M.S. This may be accomplished by directing a stream of air containing particles of sintered tungsten carbide against the interior of cutter 19. The particles used to grit blast the cone shown in FIGS. 2 and 3 were of a size that would pass −16+30 mesh screens and the air pressure was in the range of 90 to 105 pounds. The bearing surfaces 37, 38, 39 and 39A as well as the other bearing surfaces of the bit are prelubricated with a lubricant containing particles of anti-galling material and the cutter 19 is assembled upon journal 18. A series of ball bearings 21 are introduced through bore 22 into the ball race 40. The plug 23 is inserted into bore 22 and welded into place to form weld 24. Cone cutter 19 is thereby rotatably locked in place on journal 18. A lubricant containing entrained particles of anti-galling material is introduced to lubricant reservoir 26 and the diaphragm 32 and cap 30 locked in position. In another embodiment of the method of the present invention, the step of prelubricating the bearing surfaces includes coating the roughened surfaces with a film or layer of anti-galling material.

The lubricant used in the embodiment of FIGS. 2 and 3 will now be described in detail; however, it is to be understood that other forms of the lubricant may be employed as long as entrained anti-galling material is included. The lubricant is a lithum soap grease containing pure silver particles in a ratio of 5 per cent silver particles by weight. The particles are small enough to pass a 100 mesh screen and they are mechanically mixed with the lithum soap grease.

Figure 4:
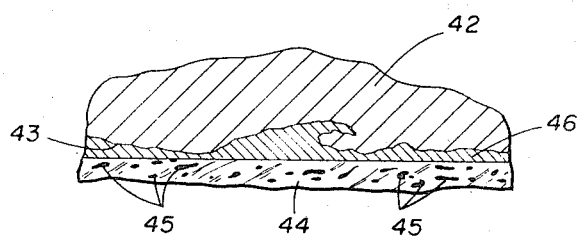
FIG. 4 illustrates diagrammatically and on a greatly enlarged scale the microscopic structure of a bearing surface of the present invention.

Referring now to FIG. 4, a microscopic study of one of the roughened bearing surfaces containing a thin film of anti-galling material is illustrated diagrammatically. A vertical section of a bushing 42 having a pitted surface 43 is shown on a greatly enlarged scale. A lubricant 44 containing particles 45 of entrained anti-galling material covers bushing 42. The entrained particles 45 have been trapped by the indentations on the pitted surface 43 and a thin film 46 of anti-galling material has built up on the surface of bushing 42. This film of anti-galling material serves to separate the rotating members and to insure continued free rotation of the bearing. Should any of the film 46 be lost, the entrained anti-galling particles 45 in the lubricant 44 are available to replace the anti-galling material lost.

Figure 5:
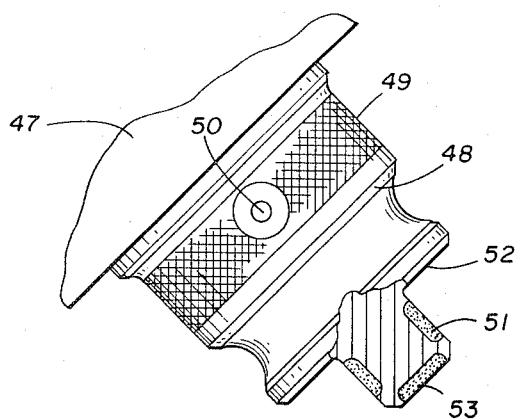
FIG. 5 shows a journal of another embodiment of the present invention.

Referring now to FIG. 5, another embodiment of the present invention is shown. One arm 47 of a three cone earth boring bit is shown, the bit body being constructed in a manner similar to that previously described. A journal 48 extends from arm 47. The surface of journal 48 includes a roughened bearing surface area 49. A cone (not shown) having an inner bearing surface is mounted on journal 48. Lubricant containing entrained particles of anti-galling material is fed from the lubricant reservoir in the body of the earth boring bit and enters the bearing area through opening 50. Some of the entrained particles of anti-galling material are captured by the roughened area 49 and a thin film of anti-galling material builds up on the bearing surface 49 of journal 48. This thin film of anti-galling material may be replenished by additional particles of anti-galling material from the lubricant. As the bit operates, free rotation is insured by the bearing system of the present invention. An additional bearing surface 51 is shown that supports rotation and two additional bearing surfaces 52 and 53 are shown that support thrust. It is to be understood that these bearing surfaces may be grit blasted by following the method of the present invention and additional roughened bearing surfaces thereby provided. The lubricant introduced to the bearing surfaces consists of a lithum soap grease containing particles of anti-galling materials in a ratio of 15 percent particles of anti-galling material and 85 percent grease. The anti-galling particles consist of one-third particles of copper, one-third particles of silver and one-third particles of graphite.

The embodiments of the invention in which an exclusive property or privilege is claimed are defined as follows:

1. An improved bearing that promotes rotation between a pair of relatively rotatable members, comprising:
   a rough bearing surface on one of the relatively rotatable members, said bearing surface having a roughness of greater than 50 R.M.S.; lubricant between said pair of relatively rotatable members; and anti-galling material entrained in said lubricant.

2. The bearing of claim 1 wherein said bearing surface roughness is in the range of from 50 to 200 R.M.S.

3. The bearing of claim 1 wherein said bearing surface roughness is in the range of from 100 to 175 R.M.S.

4. The bearing of claim 1 wherein said bearing surface roughness is in the range of from 110 to 150 R.M.S.

5. The bearing of claim 1 wherein the anti-galling material is entrained articulate particles of an anti-galling substance.

6. The bearing of claim 5 wherein the particles of an anti-galling substance are particles of metal selected from the class represented by silver, copper and aluminum.

7. The bearing of claim 5 wherein said particles are silver particles in a ratio of approximately 5 percent silver to approximately 95 percent lubricant by weight.

8. The bearing of claim 5 wherein said particles are copper particles in a ratio of approximately 5 percent copper to approximately 95 percent lubricant by weight.

9. The bearing of claim 5 wherein said particles are aluminum particles in a ratio of approximately 5 percent aluminum to approximately 95 percent lubricant by weight.

10. The bearing of claim 5 wherein said entrained articulate particles are a combination of metal particles, the metals being selected the class represented by silver, copper and aluminum.

11. The bearing of claim 5 including means for introducing the lubricant between said pair of relatively rotatable members.

12. The bearing of claim 11 wherein said means for introducing the lubricant is a lubricant reservoir connected to said bearing.

13. The bearing of claim 5 wherein the particles of an anti-galling substance are particles of anti-galling material selected from the class represented by silver, copper, aluminum, lead, zinc, tin, babbitt metal and graphite.

14. A bearing system, comprising:
   a journal;
   a rotatable member, rotatably mounted on said journal and having a bearing surface with a roughness greater than 50 R.M.S.; lubricant between said bearing surface and said journal; and anti-galling material entrained in said lubricant.

15. The bearing system of claim 14 wherein the anti-galling material is a quantity of entrained particles of an anti-galling substance.

16. The bearing system of claim 15 wherein said bearing surface roughness is in the range of from 50 to 200 R.M.S.

17. The bearing system of claim 16 wherein the anti-galling substance is selected from the class represented by silver, copper, aluminum, lead, zinc, tin, babbitt metal and graphite.

18. The bearing system of claim 17 including means for supplying said lubricant to the area between said bearing surface and said journal.

19. The bearing system of claim 18 including seal means for preventing contamination of lubricant and for preventing lubricant from escaping from the area between said bearing surface and said journal.

20. A bearing system for an earth boring bit, comprising:
   a bit body adapted to be connected to a rotary drill string;
   at least one journal connected to said bit body, with said at least one journal including a journal bearing surface;
   a rotatable cutter mounted on said at least one journal, with said rotatable cutter including a cutter bearing surface;
   a quantity of indentations on said cutter bearing surface giving said cutter bearing surface a roughness greater than 50 R.M.S.;
   a lubricant reservoir in fluid communication with the area between said bearing surfaces; and
   a lubricant in said reservoir, said lubricant containing entrained particles of anti-galling material.

21. The bearing system of claim 20 including seal means connected to said cutter for sealing the area between said journal and said cutter.

22. The bearing system of claim 21 wherein said cutter bearing surface has a roughness in the range of from 75 to 175 R.M.S.

23. The bearing system of claim 22 wherein the entrained particles of anti-galling material are particles of material selected from the class of materials represented by silver, copper and aluminum.

24. The bearing system of claim 23 including means for equalizing the pressure in the area between the bearing surfaces and the external pressure.

* * * * *